United States Patent
Kodimer

(10) Patent No.: US 10,554,474 B2
(45) Date of Patent: Feb. 4, 2020

(54) SYSTEM AND METHOD FOR BEACON INVOKED MULTIFUNCTION PERIPHERAL OPERATION

(71) Applicants: Kabushiki Kaisha Toshiba, Minato-ku (JP); Toshiba TEC Kabushiki Kaisha, Shinagawa-ku (JP)

(72) Inventor: Marianne Kodimer, Huntington Beach, CA (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 212 days.

(21) Appl. No.: 15/692,775

(22) Filed: Aug. 31, 2017

(65) Prior Publication Data
US 2018/0115454 A1    Apr. 26, 2018

Related U.S. Application Data

(60) Provisional application No. 62/410,516, filed on Oct. 20, 2016.

(51) Int. Cl.
| | | |
|---|---|---|
| G06F 15/173 | (2006.01) | |
| H04L 29/06 | (2006.01) | |
| H04W 4/70 | (2018.01) | |
| G06F 13/14 | (2006.01) | |

(52) U.S. Cl.
CPC ......... *H04L 29/06176* (2013.01); *H04W 4/70* (2018.02); *G06F 13/14* (2013.01)

(58) Field of Classification Search
CPC ...... H04L 29/06176; H04W 4/70; H04W 4/80
USPC ......................................................... 709/224
See application file for complete search history.

(56) References Cited

U.S. PATENT DOCUMENTS

| | | | | |
|---|---|---|---|---|
| 2008/0316524 A1* | 12/2008 | Lefebvre | ............... | G06F 3/1208 358/1.15 |
| 2009/0103124 A1* | 4/2009 | Kimura | ................. | G06F 3/1204 358/1.15 |
| 2010/0149572 A1* | 6/2010 | St. Jacques, Jr. | .. | H04N 1/00244 358/1.13 |
| 2011/0255110 A1* | 10/2011 | d'Entrecasteaux | ..... | G06F 3/122 358/1.13 |
| 2012/0057189 A1* | 3/2012 | DeRoller | ............... | G06F 3/1207 358/1.15 |
| 2017/0060503 A1* | 3/2017 | Tomihisa | ............... | G06F 3/1238 |
| 2017/0097797 A1* | 4/2017 | Yasuno | ................. | G06F 3/1222 |

* cited by examiner

*Primary Examiner* — Hee Soo Kim
(74) *Attorney, Agent, or Firm* — Ulmer & Berne LLP

(57) ABSTRACT

A document processing system includes a wireless data beacon associated with an MFP, which beacon broadcasts beacon identification data. A network interface receives user identification data from a portable data device corresponding to the beacon identification data, and the device sends output job queue status data to the portable data device in accordance with an address associated with the user identification data. In a complementary action, a BLUETOOTH interface of a portable data device receives a device identifier from an associated BLUETOOTH low energy beacon. The device communicates user identification data via a network interface to the MFP. The portable data device then receives status data from the document processing device and the status data is displayed on a device display.

12 Claims, 5 Drawing Sheets

Fig. 5

SYSTEM AND METHOD FOR BEACON INVOKED MULTIFUNCTION PERIPHERAL OPERATION

RELATED APPLICATIONS

This application claims the benefit of U.S. Provisional Application No. 62/410,516, filed Oct. 20, 2016, which is incorporated herein by reference.

TECHNICAL FIELD

This application relates generally to document processing operations on networked multifunction peripherals. The application relates more particularly to interaction between a multifunction peripheral and a portable user device invoked by a device beacon.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Given the expense in obtaining and maintain MFPs, devices are frequently shared or monitored by users or technicians via a data network. MFPs, while moveable, are generally maintained in a fixed location. Until more recent times, users, which may include individuals or groups such as employees, administrators or technicians administrators of networked MFPs, were also generally in relatively fixed location. A user would typically communicate documents or other information from his or her office or workstation to an MFP. An administrator or technician would also monitor devices from a workstation.

Users may send document processing jobs, such as a print request, to one or more networked document processing devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. In a shared MFP environment, a user may be required to login to an MFP before a job will print. This is particularly useful when a user does not wish others to see their printed document User devices have become increasingly mobile. Devices include portable notebook computers, handheld devices such as tablet computers, smartphones, or the like. Many users will have their devices with them throughout the day, particularly in the case of smartphones. Mobile users may not even be aware of what MFP resources are around them.

SUMMARY

In accordance with an example embodiment of the subject application, a system and method for beacon invoked multifunction peripheral operation includes a document processing system which includes a wireless data beacon associated with an MFP, which broadcasts beacon identification data. A network interface receives user identification data from a portable data device corresponding to the beacon identification data, and the device sends output job queue status data to the portable data device in accordance with an address associated with the user identification data.

In accordance with another example embodiment a BLUETOOTH interface of a portable data device receives a device identifier from an associated BLUETOOTH low energy beacon. The device communicates user identification data via a network interface to a document processing device corresponding to a received device identifier. The network interface then receives status data from the document processing device which is displayed on a device display.

BRIEF DESCRIPTION OF THE DRAWINGS

Various embodiments will become better understood with regard to the following description, appended claims and accompanying drawings wherein:

DETAILED DESCRIPTION

Figure 1:
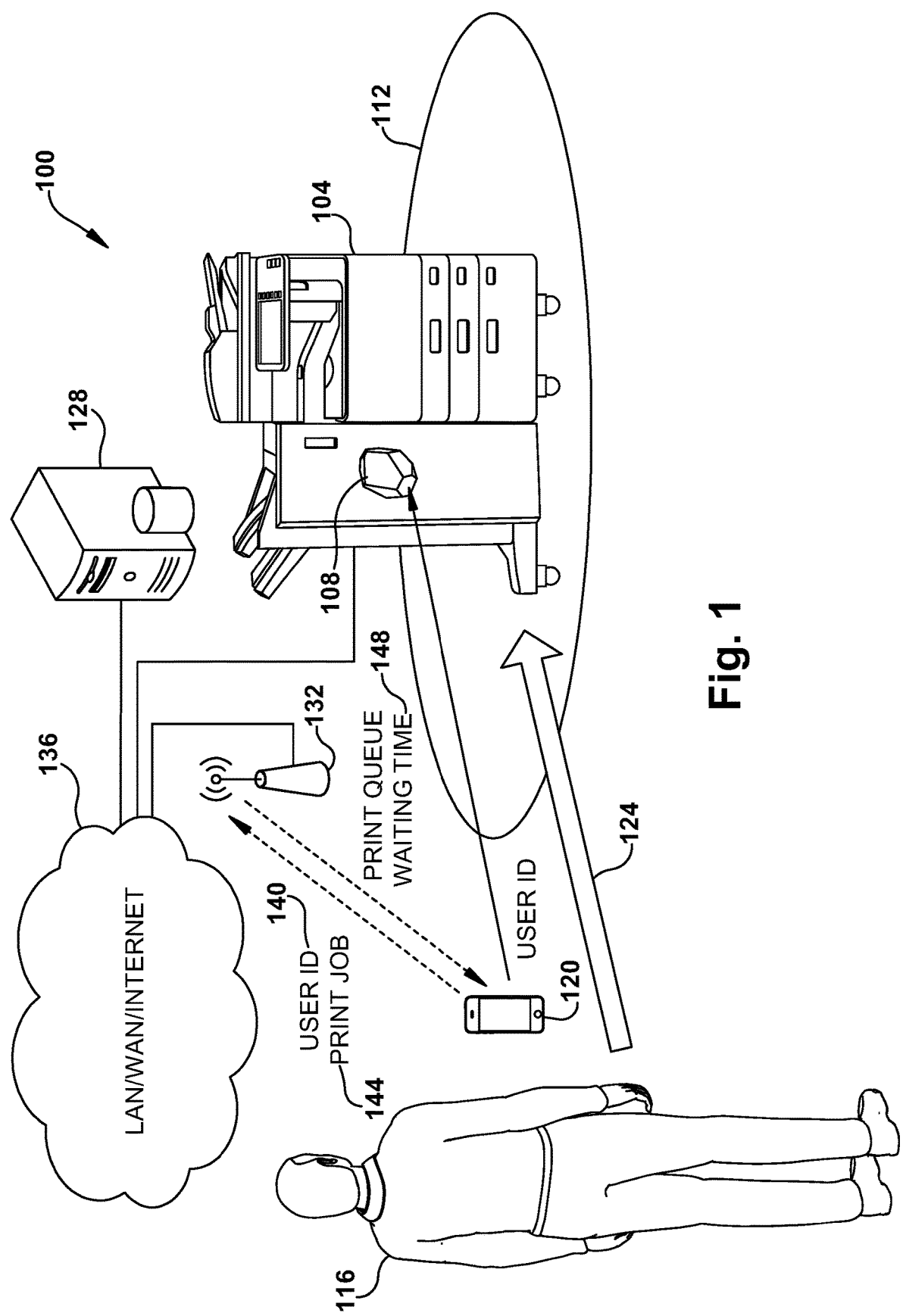
FIG. 1 an example embodiment of a beacon based MFP printing system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

When a user sends a print job to an MFP, they may walk to the device to determine if it is printed out, logging in if necessary. A user may mistakenly send a job to one device, and walk to another device only to find out their print job is unprinted. They may login to the MFP in order to see whether their job is pending, printed or missing. They may also notice a device error condition that prevents their job from being processed as desired. Such user/device interactions can be frustrating for users and waste considerable time. In example embodiments herein, a user's proximity to an MFP can be determined automatically by providing an MFP with a device beacon.

Suitable beacons include BLUETOOTH low energy (BLE) devices that broadcast an identifier to nearby portable electronic devices. Other suitable beacons include wireless radio frequency communication, such as near-field communication (NFC) devices, or optical data communication devices, such as infrared. Beacons may be purchased as standalone devices. Beacon devices are relatively inexpensive and can be battery powered. Beacons can be programmed to broadcast specified information to nearby devices. Beacons can be placed in any suitable location, including on or near an MFP device. Beacons may also be integrated into an MFP and may also be synthesized by programming of a bi-directional BLUETOOTH interface.

By way of further example, Apple, Inc. has its own beacon BLE version called iBeacon and Google, Inc. has its own version called Eddystone, formerly called UriBeacon. Beacons transmit a universally unique identifier (UUID) that can be picked up receiving hardware running in concert with any compatible application or operating system. iBeacon broadcasts a UUID information packet having a unique ID number comprising three parts, UUID, Major and Minor. Eddystone broadcasts three packets including a UUID, a universal resource locator (URL) and sensor telemetry data providing information as to the beacon's status or health.

Broadcasting Power (or Transmit Power) is the power with which the beacon broadcasts its signal. Broadcasting Power directly impacts signal range. The more power, the longer the range. Beacons do not broadcast constantly. They 'blink' instead. Advertising Interval describes the time between each blink. A Received Signal Strength Indicator (RSSI) is the strength of the beacon's signal as seen on the receiving device, such as a smartphone or tablet computer. The signal strength depends on distance and Broadcasting Power value. For a typical beacon, at maximum broadcasting power (+4 dBm), an RSSI may range from −26 (a few inches) to −100 (40-50 m distance). RSSI may be used to approximate a distance between the device and the beacon using another value defined by the iBeacon standard. External factors influencing radio waves, such as absorption, interference, or diffraction, may cause an RSSI to fluctuate. The further away the device is from the beacon, the more unstable the RSSI becomes. Measured Power is a factory-calibrated, read-only constant which indicates the expected RSSI at a distance of 1 meter to the beacon. When combined with RSSI, one can estimate the distance between the device and the beacon. iBeacon defines four proximity zones for estimating the distance to a beacon:

immediate (very close to the beacon)
near (about 1-3 m from the beacon)
far (further away or the signal is fluctuating too much to make a better estimate)
unknown (the signal is very weak)

These zones, or any other suitable beacon strength zones, are suitably used by a portable device to determine relative proximity and may be used as thresholds for triggering certain events. Alternatively, a portable user device may simply determine that it is sufficiently proximate to an MFP when it is in range to capture its UUID.

In accordance with the subject application, FIG. 1 illustrates an example embodiment of a beacon based MFP printing system 100 including MFP 104 and an associated beacon 108. Beacon 108 has a broadcast range sufficient to cover area 112 around MFP 104. User 116 has portable device, such as smartphone 120. As a user approaches MFP 104, they move into area 112 as illustrated by arrow 124, at which point a BLUETOOTH interface on user device 120 captures a device identifier, such as a UUID in the example embodiment. The UUID is associated with an MFP network address, either within user device 120, or via another device such as network server 128 which device 120 suitably contacts via a wireless network interface via access point 132. In the illustrated example, networked devices are suitably connected via network 136, suitably comprised of network local area network (LAN) or a wide area network (LAN) which may comprise the global Internet, or any combination thereof.

Once user device 120 has identified an address of MFP 104, device 120 sends identifying information 140, suitably login information for user 116, to MFP 104. A user 116 may have previously routed a print job to MFP 104, or may send a print job 144 directly from their device 120. Once MFP 104 has identified device 120, the MFP 104 captures its status data and communicates the status information via network 136 to user device 120 to generate a corresponding user display. Status information may include print queue information, such as print queue waiting time 148. Status information may also show jobs in the print queue allowing the user 116 to see their relative position. Status information can also include MFP device errors, like malfunction conditions, out-of-toner conditions, out-of-paper conditions, or the like. The user 116 can view this display on their device 120 even as they approach MFP 104, and when they arrive, they are also suitably logged in without further effort.

Figure 2:
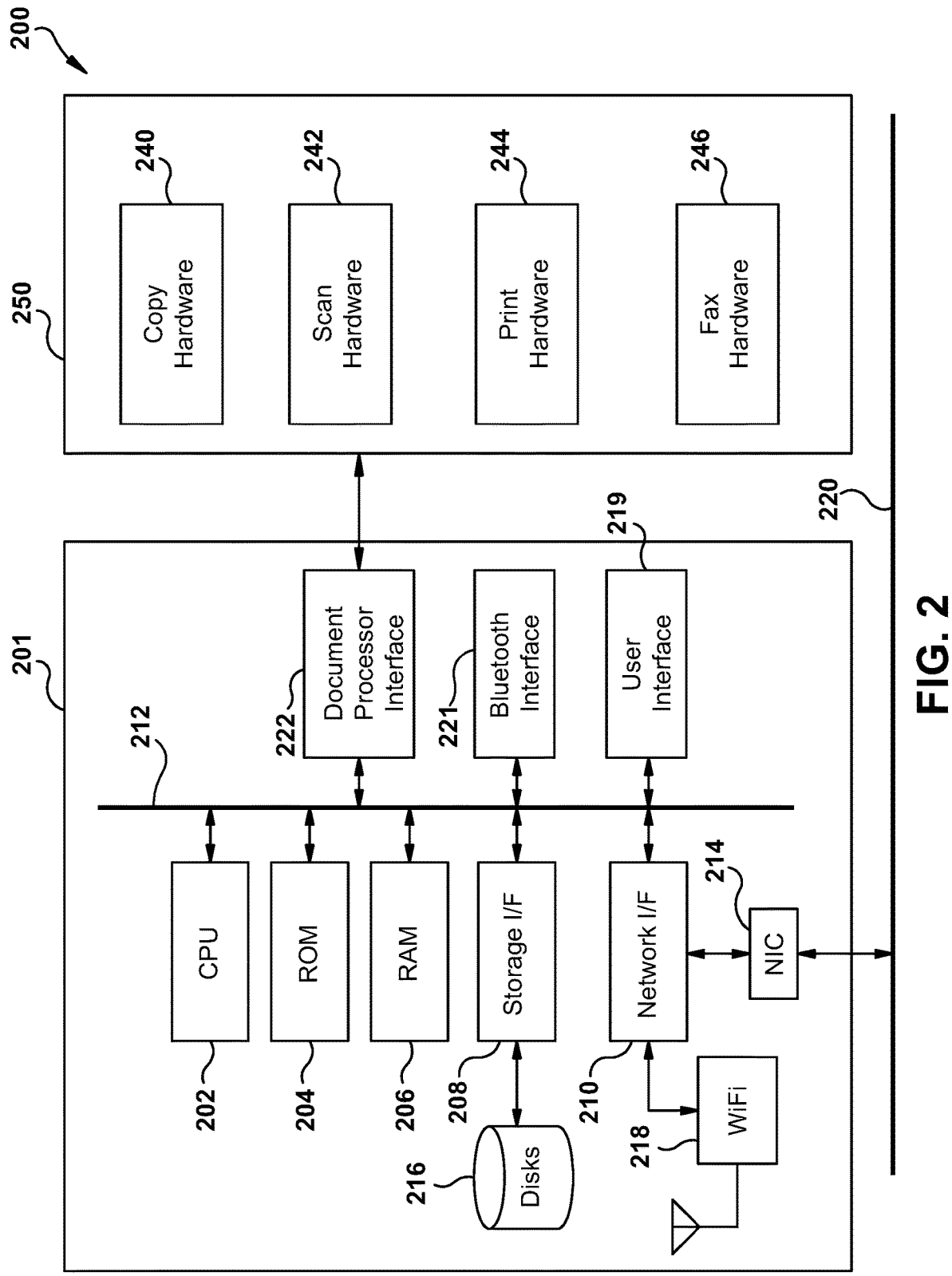
FIG. 2 is an example embodiment of a networked digital device.

Turning now to FIG. 2 illustrated is an example embodiment of a networked digital device comprised of document rendering system 200 suitably comprised within an MFP, such as with MFP 104 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with BLUETOOTH Interface 221 which may be programmed to function as a device beacon as noted above.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. Hardware monitors suitably provide device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216. It will be understood that functional units are suitably comprised of intelligent units, including any suitable hardware or software platform.

Controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
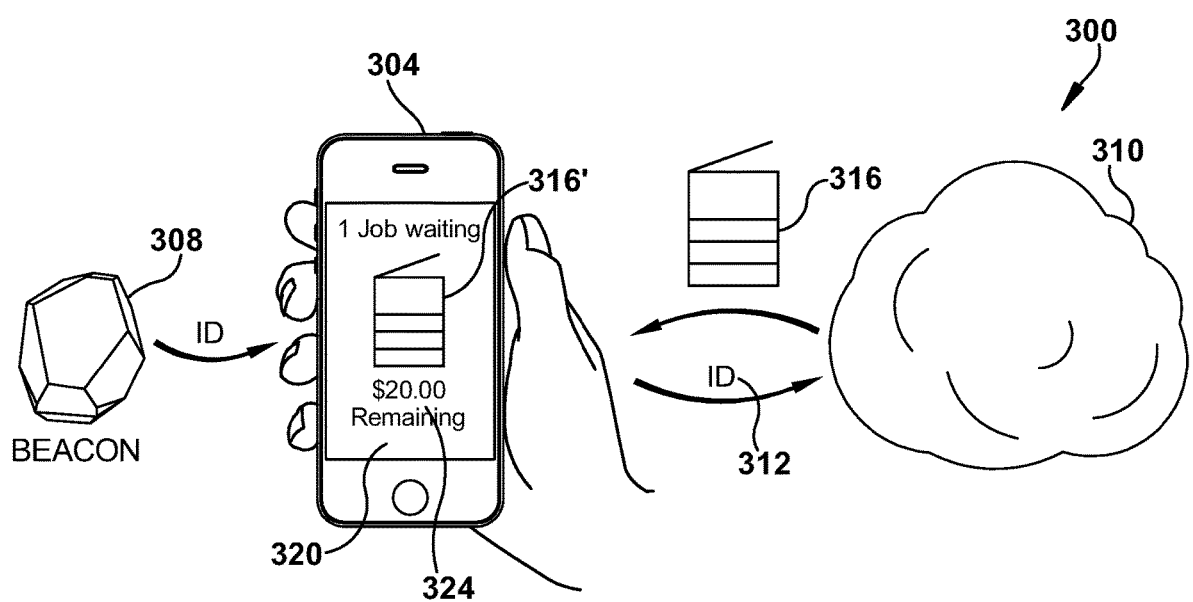
FIG. 3 is an example embodiment of a beacon initiated MFP status update to a portable device.

Turning now to FIG. 3, illustrated is an example embodiment of a beacon initiated MFP status update to a portable device 300. When smartphone 304 is sufficiently proximate to BLUETOOTH beacon 308, communication with an MFP associated with beacon 308 is made via network 310 and smartphone 304 sends its identifier 312 to that MFP via the network and, in turn receives status information including print queue information 316 from the MFP. A display 316' of print queue information 316 is generated on smartphone user interface display 320. Additional or alternative MFP status information may include account information 324, such as how much money remains on account for the user for pay-for-use MFP operation. Other information may also include device error information, out-of-toner information, out-of-paper information, or the like. A user may view MFP status as informational only, or may send further instructions to the MFP to abort or re-route their job or jobs do one or more alternative MFPs.

Figure 4:
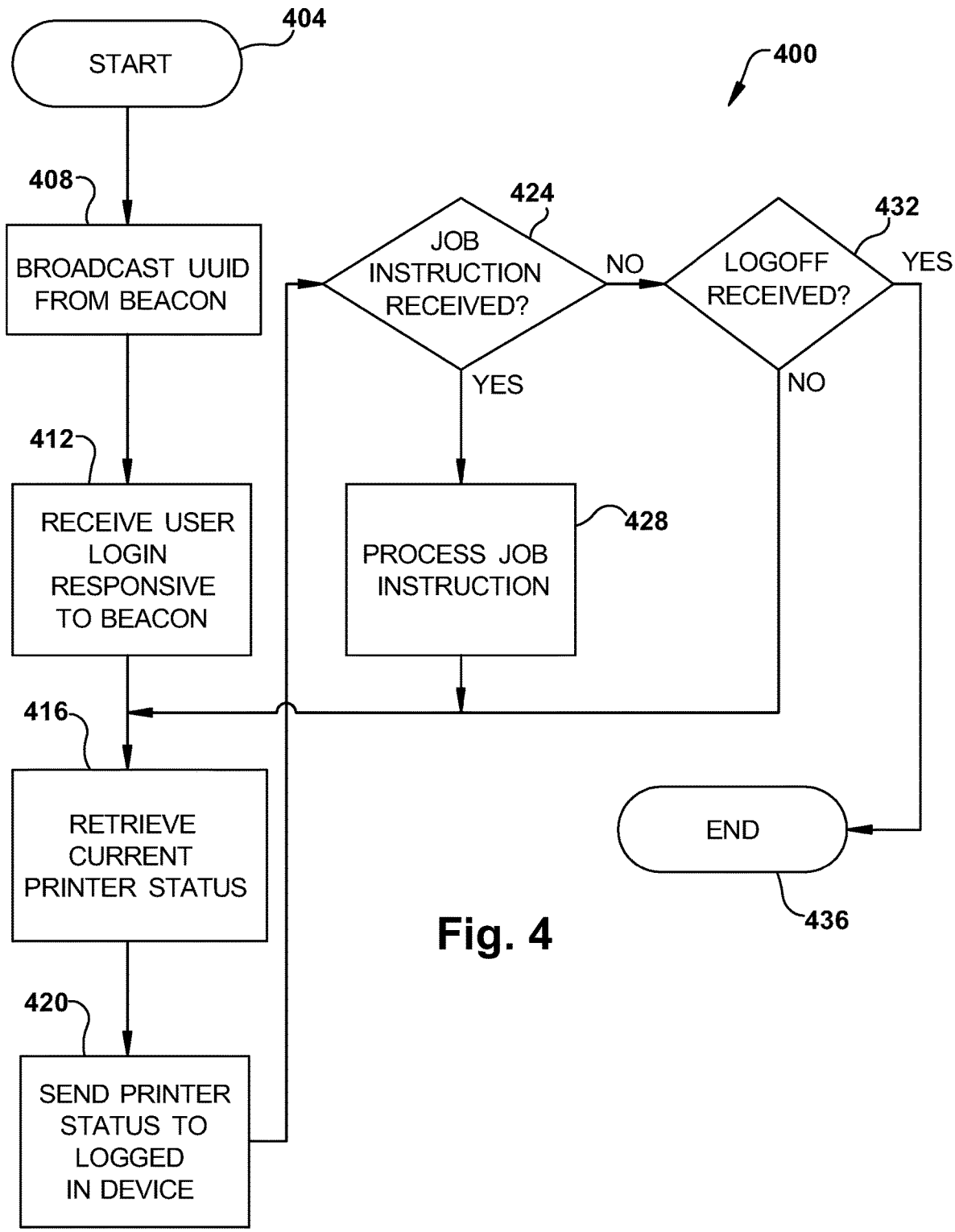
FIG. 4 is a flowchart of an embodiment of a beacon invoked MFP operation.

FIG. 4 illustrates a flowchart 400 for beacon invoked MFP operation. The process commences at block 404 and a device identifier, such as a UUID is broadcast at block 408. A user response to the beacon is received at block 412, prompting the MFP to take a snapshot of its relevant status information at block 416, and send this status information to the user device at block 420. If a job instruction is received at block 424, it is processed by the MFP at block 428 and the MFPs updated status is captured and relayed to the user by returning to block 416. If no job instruction is received, then if the user logs off at block 432, or alternatively if the user's job is completed or after a default timeout period, the process ends at block 436.

Figure 5:
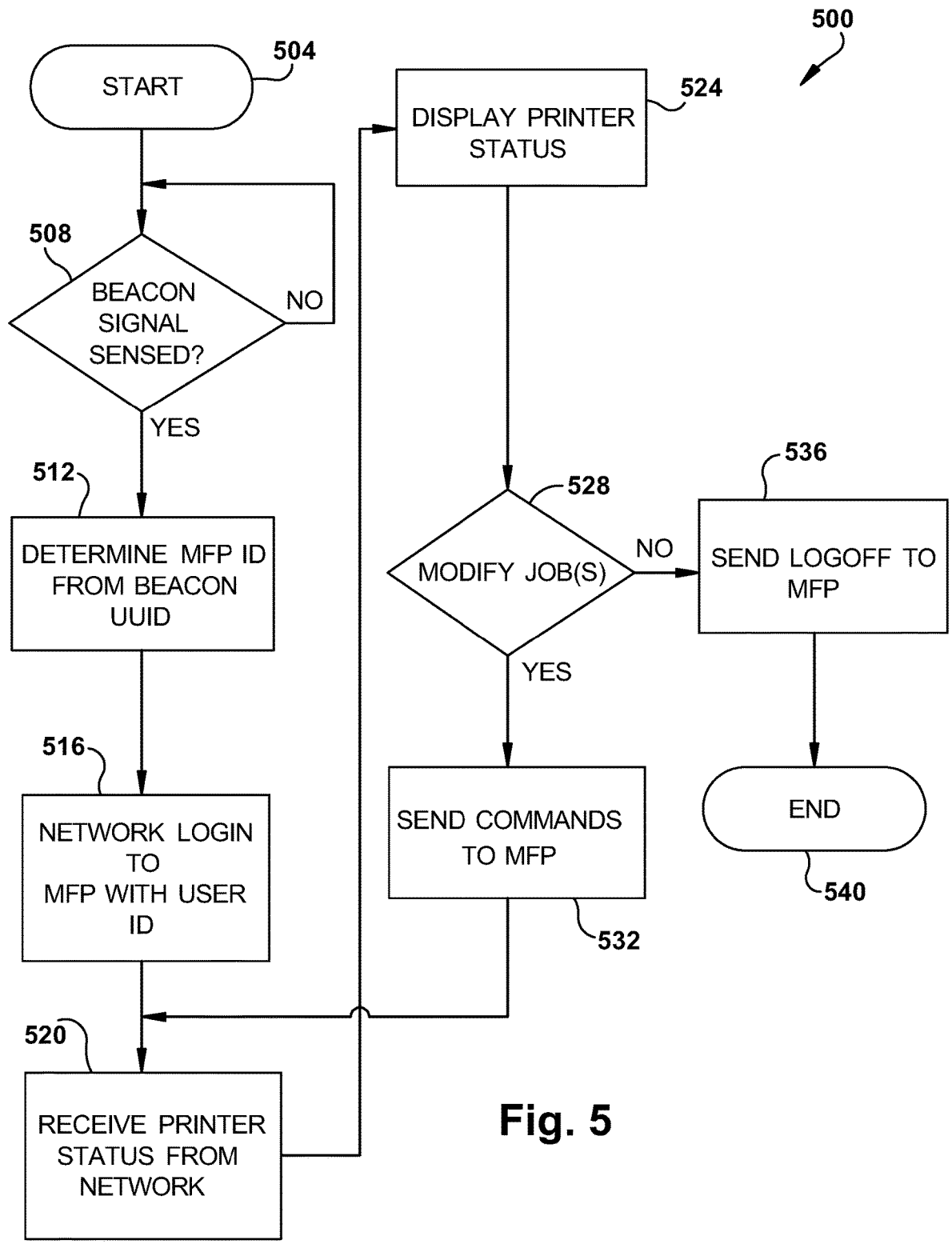
FIG. 5 is a flowchart of an embodiment of operations for beacon invoked user device MFP interaction.

Referring next to FIG. 5, illustrated is a flowchart 500 for beacon invoked user device MFP interaction. The process commences at block 504 and remains at block 508 until such time as a beacon is sensed, and once so, a UUID is captured and the associated MFP identified at block 512. The user device logs into the MFP at block 516, and in turn, receives MFP status data at block 520. This status data is displayed at block 524. When a user chooses to modify a job at block 528, for example to reroute a current job to a different MFP, corresponding instructions or commands are sent to the MFP at block 532 and processing returns to block 520 where the user receives updated MFP status data. If not, the device suitably sends a logoff command to the MFP at block 536, and the process ends at block 540.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing system comprising:
   an intelligent controller including a processor and memory;
   a document processor;
   a wireless data beacon configured to broadcast beacon identification data; and
   a network interface configured to receive user identification data from a portable data device corresponding to the beacon identification data, wherein
   the processor is configured to generate, responsive to received user identification data, job accounting data to the portable data device via the network interface, wherein the job accounting data is comprised of an available account balance for pay-per-use document processing operations, which account balance corresponds to the user identification data,
   the processor is further configured to receive a document processing job request associated with received user identification data,
   the network interface is further configured to output device status data comprising a print queue status and device error information to the portable data device in accordance with an address associated with the user identification data,
   the processor is further configured to receive an abort or re-route instruction from the portable data device responsive to a display of the account balance, print queue status and device error information, and
   the processor is further configured to abort or reroute the document processing job request to a second document processing device responsive to a received abort or re-route instruction.

2. The document processing system of claim 1 wherein the processor is configured to generate, responsive to received user identification data, a device connection notification to the portable data device via the network interface.

3. The document processing system of claim 1 wherein the processor is configured to generate, responsive to received user identification data, device status data corresponding to a current status of the document processor to the portable data device via the network interface.

4. The document processing device of claim 1 wherein the processor is configured to modify the document processing job associated with the user identification data in accordance with an instruction received from the portable data device via the network interface.

5. The document processing system of claim 4 wherein the processor is configured to reroute the document processing job to the second document processing system via the network interface.

6. A method comprising:
   broadcasting beacon identification data via a wireless data beacon associated with a document processing system;
   receiving, via a network interface of the document processing system, user identification data from a portable data device corresponding to the beacon identification data;
   generating, responsive to received user identification data, job accounting data to the portable data device via the network interface, wherein the job accounting data is comprised of an available account balance for pay-per-use document processing operations, and which account balance corresponds to the user identification data,
   receiving a document processing job request associated with received user identification data;
   outputting, via the network interface, job queue status data device error status data to the portable data device in accordance with an address associated with the user identification data;
   outputting, via the network interface, receiving an abort or re-route instruction from the portable data device responsive to a display of the account balance, job queue status data and device error status data, and aborting or rerouting the document processing job request to a second document processing device responsive to a received abort or re-route instruction.

7. The method of claim 6 further comprising:
generating a device connection notification; and
outputting the device connection notification to the portable data device via the network interface.

8. The method of claim 6 further comprising:
generating device status data corresponding to a current status of an associated document processing engine responsive to received user identification data; and
outputting the device status data to the portable data device via the network interface.

9. The method of claim 6 further comprising modifying a the document processing job associated with the user identification data in accordance with an instruction received from the portable data device via the network interface.

10. The method of claim 9 further comprising rerouting a the document processing job to the second document processing system via the network interface in accordance with a re-route instruction received from the portable data device via the network interface.

11. A device comprising:
a user interface including a user input and a display;
a BLUETOOTH interface configured to receive a device identifier from an associated BLUETOOTH low energy beacon;
a network interface configured to communicate a document processing job to a document processing device; and a processor configured to communicate user identification data via the network interface to the document processing device corresponding to a received device identifier, wherein the network interface is configured to receive, from the document processing device via the network interface, status data corresponding to a current status of the document processing device, the status data including a print queue status and device error information, wherein the network interface is further configured to receive, from the document processing device, an available account balance for pay-per-use document processing operations, which available account balance is associated with a device user, wherein the processor is further configured to display the current status of the document processing device and the available account balance on the display, wherein the processor is further configured to receive an abort or re-route instruction from the user via the user interface responsive to a display of the current status of the document processing device and the available account balance, and wherein the processor is further configured to instruct an abort or re-route of the document processing job to another document processing device responsive to a received abort or re-route instruction.

12. The device of claim 11 wherein the processor is further configured to send a device login request including a user identifier to the document processing device via the network interface.

* * * * *